United States Patent
Noma et al.

(10) Patent No.: US 7,791,906 B2
(45) Date of Patent: Sep. 7, 2010

(54) DC TO DC CONVERTER MODULE

(75) Inventors: Takashi Noma, Shiga-ken (JP); Nobuo Ikemoto, Shiga-ken (JP); Yoshihiko Nishizawa, Kyoto-fu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/426,352

(22) Filed: Apr. 20, 2009

(65) Prior Publication Data

US 2009/0201005 A1 Aug. 13, 2009

Related U.S. Application Data

(63) Continuation of application No. PCT/JP2007/071614, filed on Nov. 7, 2007.

(30) Foreign Application Priority Data

Jan. 19, 2007 (JP) ............................... 2007-010754

(51) Int. Cl.
*H02M 3/335* (2006.01)
*G05F 1/10* (2006.01)
(52) U.S. Cl. ...................... 363/20; 363/21.01; 323/222; 323/282
(58) Field of Classification Search ................. 363/20, 363/21.01, 21.02; 323/222, 282
See application file for complete search history.

(56) References Cited

U.S. PATENT DOCUMENTS

2004/0179383 A1 9/2004 Edo et al.

FOREIGN PATENT DOCUMENTS

| JP | 9-7836 A | 1/1997 |
| JP | 2004-266233 A | 9/2004 |
| JP | 2004-343976 A | 12/2004 |
| JP | 2006-42538 A | 2/2006 |
| JP | 2006-271135 A | 10/2006 |

OTHER PUBLICATIONS

"International Search Report"; PCT/JP2007/071614; Jan. 29, 2008.
Takayuki Sugiura; "Written Opinion of the International Searching Authority"; PCT/JP2007/071614; Jan. 29, 2008.

*Primary Examiner*—Bao Q Vu
(74) *Attorney, Agent, or Firm*—Studebaker & Brackett PC; Tim L. Brackett, Jr.

(57) ABSTRACT

Lower surface terminals are disposed at the lower surface of a magnetic substrate. An upper surface electrode is disposed at the upper surface of the magnetic substrate. A control circuit, an input capacitor, and an output capacitor are mounted on the upper surface electrode. The control circuit contains a switching element. A smoothing choke is disposed inside the magnetic substrate. The connection wiring of connecting the upper surface electrode and at least one of the input terminal, the output terminal, and the ground terminal is constructed using an inner conductor passing through the inside of the magnetic substrate, and the connection wiring forms an inductor.

21 Claims, 14 Drawing Sheets

DC TO DC CONVERTER MODULE

CROSS REFERENCE TO RELATED APPLICATIONS

The present application is a continuation of International Application No. PCT/JP2007/071614, filed Nov. 7, 2007, which claims priority to Japanese Patent Application No. JP2007-010754 filed Jan. 19, 2007, the entire contents of each of these applications being incorporated herein by reference in their entirety.

BACKGROUND OF THE INVENTION

1. Field of the Invention

The present invention relates to a DC to DC (i.e., DC-DC) converter module in which various components, including a switching element, are mounted on a magnetic substrate that incorporates magnetic elements, including a smoothing choke and a transformer among main components, and that serves as a component carrying substrate.

2. Description of Related Art

Various typical non-isolated DC-DC converter circuits and current waveforms of portions thereof are illustrated in FIGS. 1 to 3.

FIG. 1(A) is a circuit diagram of a step-down DC-DC converter 11 having an input terminal IN connected to an input voltage source 9. FIG. 1(B) illustrates waveforms of currents Ia and Ib illustrated in FIG. 1(A). FIG. 2(A) is a circuit diagram of a step-up DC-DC converter 12 having an input terminal IN connected to an input voltage source 9. FIG. 2(B) illustrates waveforms of currents Ia and Ib illustrated in FIG. 2(A). FIG. 3(A) is a circuit diagram of an inverting DC-DC converter 13 having an input terminal IN connected to an input voltage source 9. FIG. 3(B) illustrates waveforms of currents Ia and Ib illustrated in FIG. 3(A).

As illustrated in FIG. 1(A), the step-down DC-DC converter includes a switching portion 21, an input capacitor Ca disposed adjacent to an input side thereof, and an output capacitor Cb disposed adjacent to an output side thereof. The switching portion 21 contains a switching element Q, a diode (i.e., flywheel element) D, and a smoothing choke Lb.

For the step-down DC-DC converter, as illustrated in FIG. 1(B), the input current Ia of the switching portion 21 exhibits a discontinuous waveform in which a rectangular pulse current flows when the switching element Q is in an ON state. The output current Ib of the switching portion 21 exhibits a continuous waveform containing ripples.

As illustrated in FIG. 2(A), the step-up DC-DC converter includes a switching portion 22, an input capacitor Ca disposed adjacent to an input side thereof, and an output capacitor Cb disposed adjacent to an output side thereof. The switching portion 22 contains a switching element Q, a diode (i.e., flywheel element) D, and a smoothing choke La.

For the step-up DC-DC converter, as illustrated in FIG. 2(B), the input current Ia of the switching portion 22 exhibits a continuous waveform containing ripples. The output current Ib of the switching portion 22 exhibits a discontinuous waveform in which a rectangular pulse current flows when the switching element Q in an OFF state.

As illustrated in FIG. 3(A), the inverting DC-DC converter includes a switching portion 23, an input capacitor Ca disposed adjacent to an input side thereof, and an output capacitor Cb disposed adjacent to an output side thereof. The switching portion 23 contains a switching element Q, a diode (i.e., flywheel element) D, and a smoothing choke Lab.

For the inverting DC-DC converter module, as illustrated in FIG. 3(B), the input current Ia and the output current Ib of the switching portion 23 both exhibit a discontinuous waveform in which a rectangular pulse current flows.

An isolated DC-DC converter module circuit is illustrated in FIG. 4. FIG. 4(A) is a circuit diagram of a forward DC-DC converter. FIG. 4(B) is a circuit diagram of a flyback DC-DC converter.

As illustrated in FIG. 4(A), the forward DC-DC converter includes a switching portion 24, an input capacitor Ca disposed adjacent to an input side thereof, and an output capacitor Cb disposed adjacent to an output side thereof. The switching portion 24 contains a switching element Q, a transformer T, diodes Da and Db, and a choke coil Lc.

For this forward DC-DC converter, as similar to the step-down DC-DC converter, the input current Ia of the switching portion 24 exhibits a discontinuous waveform in which a rectangular pulse current flows when the switching element Q is in an ON state, and the output current Ib of the switching portion 21 exhibits a continuous waveform containing ripples.

As illustrated in FIG. 4(B), the flyback DC-DC converter includes a switching portion 25, an input capacitor Ca disposed adjacent to an input side thereof, and an output capacitor Cb disposed adjacent to an output side thereof. The switching portion 25 contains a switching element Q, a transformer T, and a diode Da.

For this flyback DC-DC converter, as similar to the inverting DC-DC converter, the input current Ia of the switching portion 25 is pulsed, and the output current Ib of the switching portion 25 is a discontinuous waveform in which a rectangular pulse current flows when the switching element Q is an OFF state.

A DC-DC converter module configured in a magnetic insulated substrate with the aim of reducing the size of the DC-DC converter is disclosed in Japanese Unexamined Patent Application Publication No. 2004-343976.

For example, in the case of the step-down DC-DC converter and the forward DC-DC converter, the input current input into the switching portion is pulsed, as illustrated in FIG. 1(B). If this input pulse current flows through wiring between the input voltage source and the main body of the DC-DC converter, a problem arises in which noise (e.g., fundamental noise and harmonics noise of the pulse current) occurs from there. To address this, the pulse current is supplied from the input capacitor Ca, and the current path is completed within the module.

However, when the DC-DC converter module is implemented on a circuit board of an electronic device, the input voltage source and the DC-DC converter module may be spaced apart. As a large proportion of the above pulse current flows into the input capacitor Ca, and as the pulse current Ic also flows from the input voltage source 9 to the DC-DC converter 11, if the gap between the input voltage source and the DC-DC converter module is relatively large, the size of the loop of the current IC flowing through the wiring therebetween is large. This leads to an increase in occurrence of electromagnetic noise, and the increase is a problem.

For the step-up DC-DC converter, as illustrated in FIG. 2(B), the output current Ib output from the switching portion is pulsed. Thus, the output capacitor Cb is provided such that the pulse current can be prevented from flowing into the loading side and such that the output voltage can be prevented from having a ripple.

However, to enable a large proportion of the above pulse current to flow into the output capacitor Cb, it is necessary for the output capacitor Cb to have a large capacity and low resistance, so there is a limit to the use of only a capacitor.

The inverting DC-DC converter and the flyback DC-DC converter have both of the above-described problem occurring in the step-down DC-DC converter and that in the step-up DC-DC converter.

Japanese Unexamined Patent Application Publication No. 2004-343976 relates to a DC-DC converter module in which various components, including a switching element, are mounted on a magnetic substrate that incorporates merely a choke component and that serves as a component carrying substrate. Japanese Unexamined Patent Application Publication No. 2004-343976 does not describe a structure for reducing noise.

One approach to solving the above problems is to use a component resistant to allowing a radio-frequency content to pass therethrough, such as an inductor or a ferrite bead. This approach can prevent noise caused by the pulse current from leaking out. However, because of the necessity to use such an additional antinoise component, the problem of increasing a footprint and cost remains.

SUMMARY OF THE INVENTION

To overcome the problems described above, preferred embodiments of the present invention provide a DC-DC converter module achieving a small footprint with respect to a circuit board of an electronic device in which the DC-DC converter module is embedded at a low cost.

To solve the above problems, a DC-DC converter according to the present invention is configured as various embodiments described hereinafter.

According to an embodiment of the present invention, a DC-DC converter module includes a switching portion, an input capacitor disposed adjacent to an input side of the switching portion, and an output capacitor disposed adjacent to an output side of the switching portion. The switching portion includes a switching element and a magnetic element. The DC-DC converter module further includes a magnetic substrate having a lower surface at which an input terminal, an output terminal, and a ground terminal are disposed and having an upper surface at which an upper surface electrode (e.g., circuit wiring) is disposed. The switching element, the input capacitor, and the output capacitor are mounted on the upper surface electrode. The magnetic element is disposed inside the magnetic substrate. Connection wiring of connecting the upper surface electrode and at least one of the input terminal, the output terminal, and the ground terminal is constructed using an inner conductor passing through the inside of the magnetic substrate.

According to an embodiment of the present invention, a DC-DC converter module may perform switching control such that an input current to the switching portion is discontinuous and an output current from the switching portion is continuous. That is, the DC-DC converter module can be, for example, a non-isolated step-down or forward DC-DC converter module. The connection wiring (e.g., L2, L3 in FIG. 6) of connecting the input terminal and the upper surface electrode may be constructed using the inner conductor.

According to an embodiment of the present invention, a DC-DC converter module in which the input current to the switching portion is discontinuous, the connection wiring of connecting the output terminal and the upper surface electrode may be constructed using an end face conductor (e.g., S4 in FIG. 8) extending along an end face of the magnetic substrate.

According to an embodiment of the present invention, a DC-DC converter module in which the input current to the switching portion is discontinuous, connection wiring (e.g., L4, L5 in FIG. 21) of connecting the upper surface electrode and opposite ends of the magnetic element may be constructed using the inner conductor.

According to an embodiment of the present invention, a DC-DC converter module may perform switching control such that an input current to the switching portion is continuous and an output current from the switching portion is discontinuous. That is, the DC-DC converter module may be, for example, a non-isolated step-up DC-DC converter module. The connection wiring (e.g., L3 in FIGS. 13 and 14) of connecting the output terminal and the upper surface electrode may be constructed using the inner conductor.

According to an embodiment of the present invention, a DC-DC converter module in which the output current from the switching portion is discontinuous, the connection wiring of connecting the input terminal and the upper surface electrode may be constructed using an end face conductor (e.g., S4 in FIG. 15 and FIG. 16) extending along an end face of the magnetic substrate.

According to an embodiment of the present invention, a DC-DC converter module may perform switching control such that an input current to the switching portion is discontinuous and an output current from the switching portion is also discontinuous. The DC-DC converter module may be, for example, an inverting or flyback DC-DC converter module. The connection wiring (e.g., L2 and L3 in FIGS. 17 and 18) of connecting the upper surface electrode and each of the output terminal and the input terminal may be constructed using the inner conductor.

According to an embodiment of the present invention, a DC-DC converter module in which the input current to the switching portion and the output current from the switching portion are both discontinuous, the connection wiring (e.g., S4 in FIG. 19 and FIG. 20) of connecting the ground terminal and the upper surface electrode may be constructed using an end face conductor extending along an end face of the magnetic substrate.

According to an embodiment of the present invention, an end face conductor may be a divided via formed by vertical division of a via filled with a conductive material along the center of the via, as shown in, e.g., FIG. 23.

According to an embodiment of the present invention, an inner conductor may be a via filled with a conductive material.

The aforementioned embodiments of the present invention offer corresponding advantages described below.

(1) Configuring the connection wiring of at least one of the input terminal, the output terminal, and the ground terminal to the upper surface electrode using the inner conductor passing through the inside of the magnetic substrate allows the connection wiring to have a relative large inductance content and, thus, substantially reduces the pulse current flow in that connection wiring. Accordingly, the pulse current mainly flows through the input capacitor and the output capacitor. Further, the amount of the current flowing outside the module can be reduced, and, as a result, the occurrence or leakage of noise can be suppressed.

(2) In a DC-DC converter module of the type of discontinuous input current-continuous output current of the switching portion (e.g., a non-isolated step-down or forward DC-DC converter module), configuring the connection wiring of connecting the input terminal and the upper surface electrode using the inner conductor passing through the inside of the magnetic substrate enables the pulse current flowing from the input voltage source, when the switching element is in an ON state, to be effectively suppressed by the inductance of the connection wiring of connecting the input terminal and the upper surface electrode.

(3) In a DC-DC converter module of the "discontinuous input current-continuous output current" type, configuring the connection wiring of connecting the output terminal and the upper surface electrode using the end face conductor extending along the end face of the magnetic substrate can reduce the impedance of the output capacitor with respect to the pulse current. Thus, a rectangular wave content appearing in a ripple of the output voltage can be effectively suppressed correspondingly.

(4) In a DC-DC converter module of the "discontinuous input current-continuous output current" type, configuring the connection wiring of connecting the opposite ends of the magnetic element (i.e., smoothing choke) and the upper surface electrode using the inner conductor passing through the inside of the magnetic substrate can increase the inductance of the smoothing choke and reduce the ripple of the output voltage determined by the inductance value of the smoothing choke and the capacitance value of the output capacitor. In addition, because of the structure in which an inductor is inserted between the output terminal and the output capacitor, the inductor can suppress noise leakage, and, thus, the ripple of the output voltage can be further suppressed.

(5) In a DC-DC converter module of the "continuous input current-discontinuous output current" type (e.g., non-isolated step-up DC-DC converter module), configuring the connection wiring of connecting the output terminal and the upper surface electrode using the inner conductor passing through the inside of the magnetic substrate leads to the structure in which the inductor is inserted in front of the output terminal. That inductor can suppress noise leakage and suppress the ripple of the output voltage supplied from the output terminal to the load.

(6) In a DC-DC converter module of the "continuous input current-discontinuous output current" type, configuring the connection wiring of connecting the input terminal and the upper surface electrode using the end face conductor extending along the end face of the magnetic substrate can reduce an inductance content of the inductance disposed in series to the input capacitor. This causes a large proportion of the input current in the switching portion to flow through the input capacitor. Accordingly, the volume of the pulse current from the input voltage source can be suppressed, and the occurrence of noise can be effectively suppressed.

(7) In a DC-DC converter module of the "discontinuous input current-discontinuous output current" type (e.g., inverting or flyback DC-DC converter module), configuring the connection wiring of connecting the upper surface electrode and each of the input terminal and the output terminal using the inner conductor passing through the inside of the magnetic substrate leads to the structure in which an inductor is inserted adjacent to the input terminal. Thus, the pulse current flowing from the input terminal can be suppressed, and the occurrence of noise can be suppressed. Because the DC-DC converter has a structure in which an inductor is placed in front of the output terminal, noise leakage can be suppressed and the ripple of the output voltage supplied from the output terminal to the load can be suppressed.

(8) In an inverting DC-DC converter module, configuring the connection wiring of connecting the ground terminal and the upper surface electrode using the end face conductor extending along the end face of the magnetic substrate can suppress noise appearing in the ground terminal resulting from the pulsating ripple current flowing in that connection wiring.

(9) The use of a divided via formed by vertical division of a via filled with a conductive material along the center of the via in the end face conductor enables the end face conductor to be easily constructed when the magnetic substrate is formed by being separated from the mother board.

(10) Providing the inner conductor using the via filled with the conductive material enables the inner conductor to be easily constructed together with another magnetic element within a multilayer magnetic substrate.

BRIEF DESCRIPTIONS OF THE DRAWINGS

FIG. 10(A) and FIG. 10(B) each illustrates characteristics of the step-down DC-DC converter.

Figure 11:
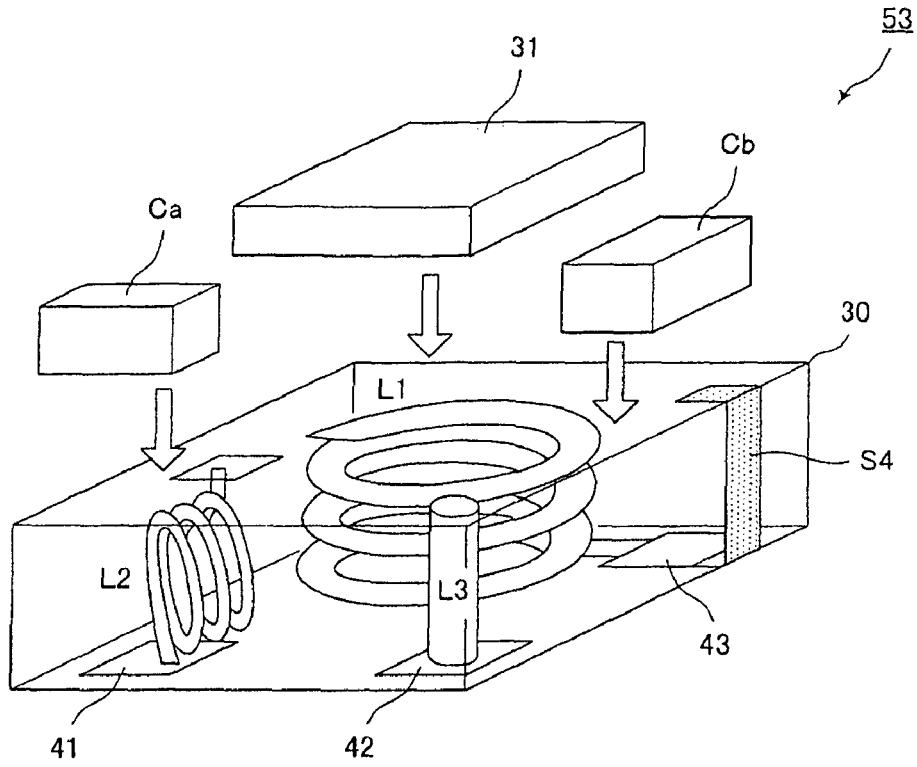

FIG. 11 is an exploded perspective view of a step-down DC-DC converter according to a third embodiment.

Figure 12:
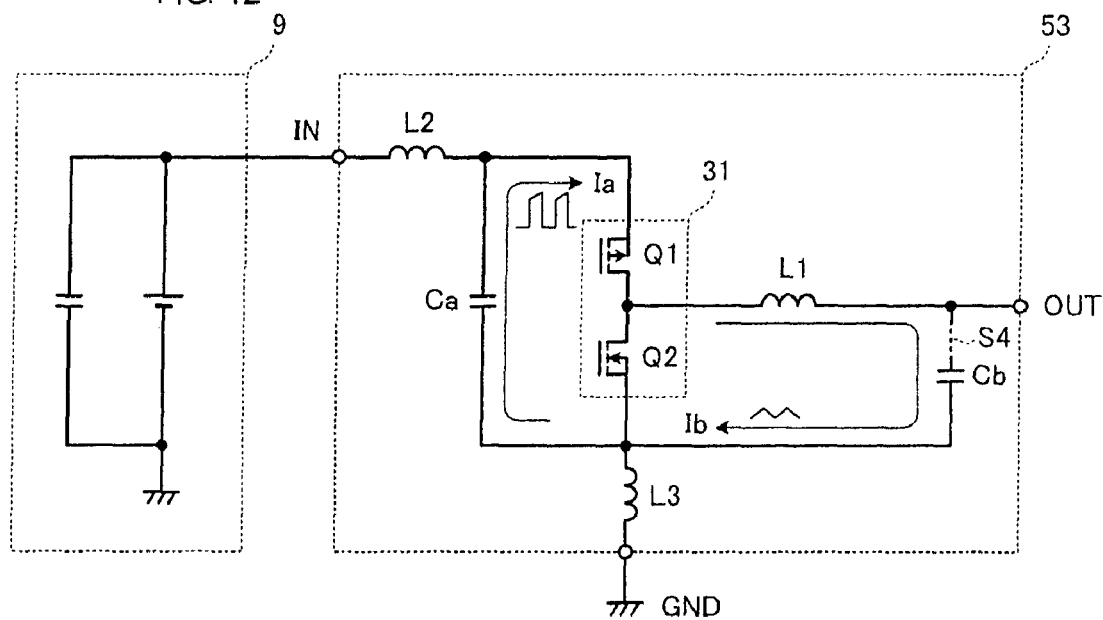

FIG. 12 is a circuit diagram of the step-down DC-DC converter according to the third embodiment.

Figure 13:
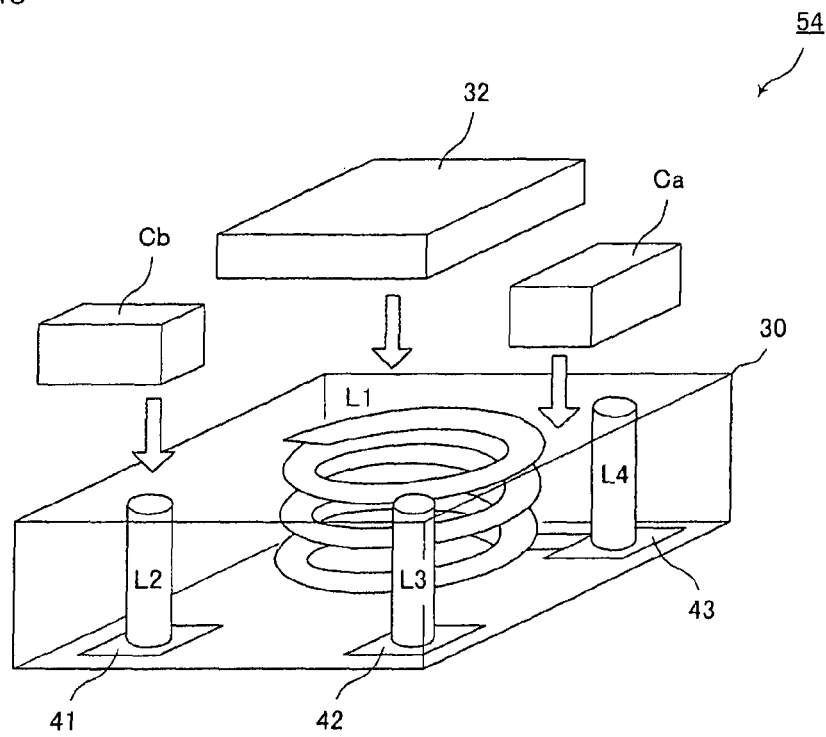

FIG. 13 is an exploded perspective view of a step-up DC-DC converter according to a fourth embodiment.

Figure 14:
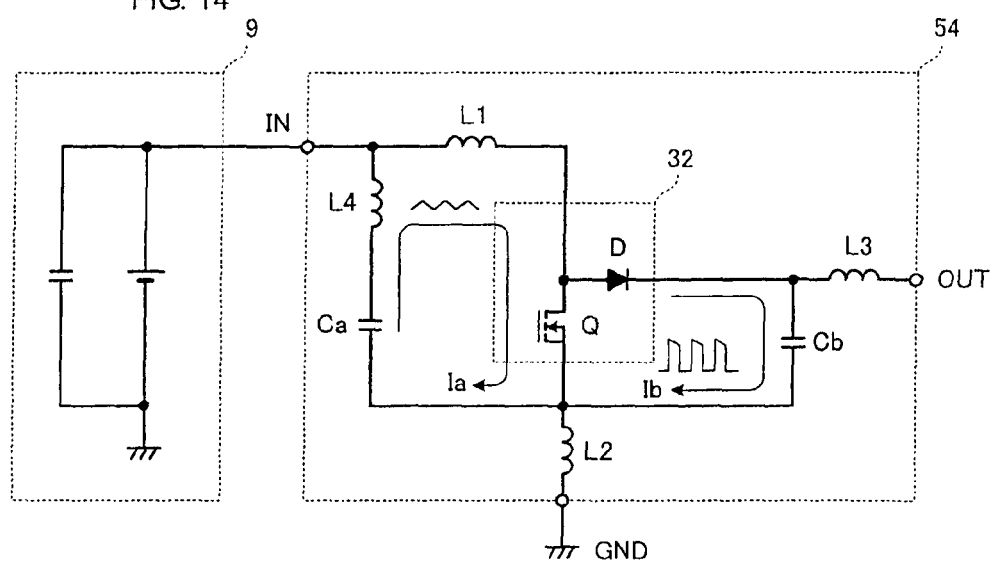

FIG. 14 is a circuit diagram of the step-up DC-DC converter according to the fourth embodiment.

Figure 15:
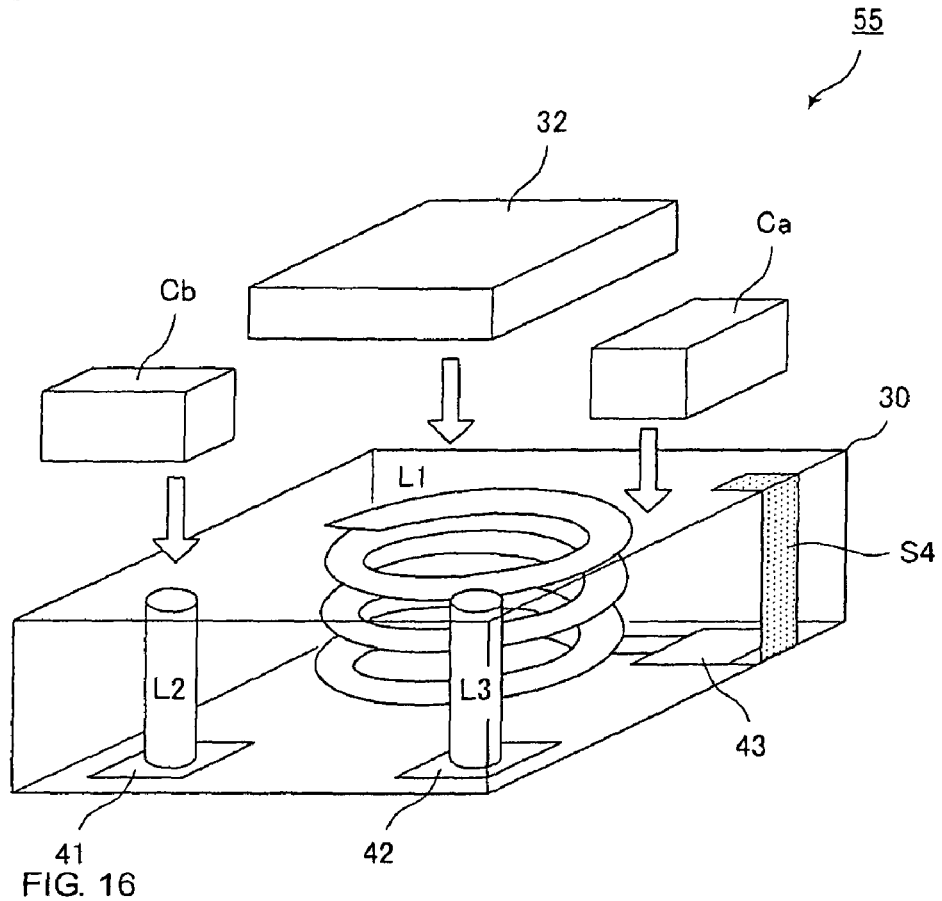

FIG. 15 is an exploded perspective view of a step-up DC-DC converter according to a fifth embodiment.

Figure 16:
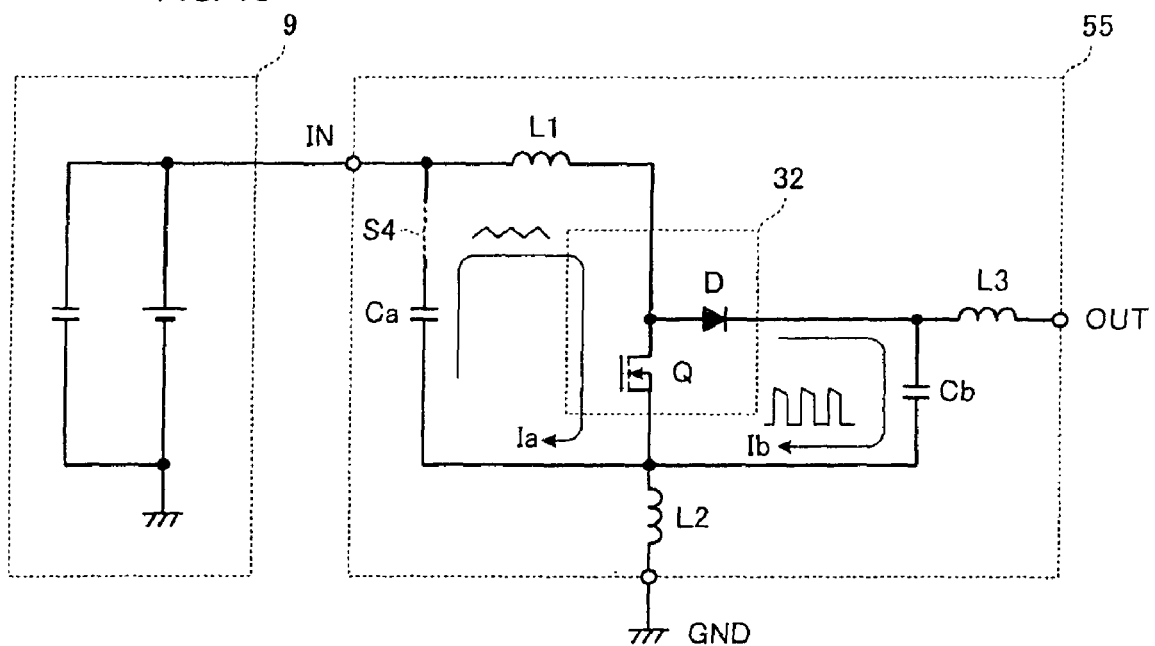

FIG. 16 is a circuit diagram of the step-up DC-DC converter according to the fifth embodiment.

Figure 17:
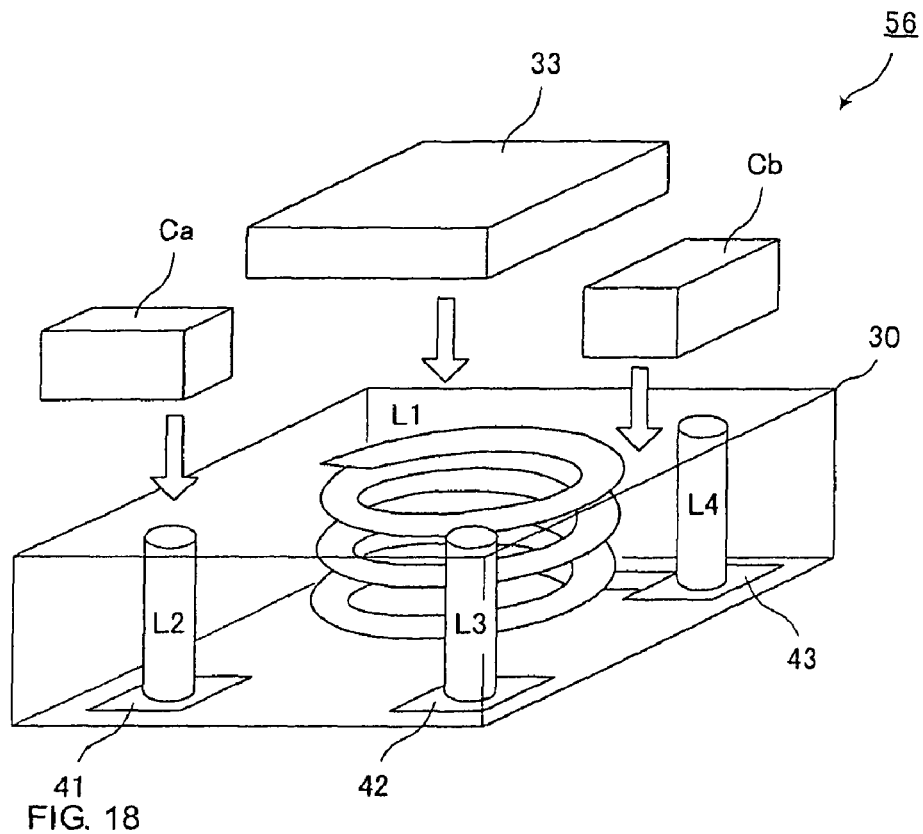

FIG. 17 is an exploded perspective view of an inverting DC-DC converter according to a sixth embodiment.

Figure 18:
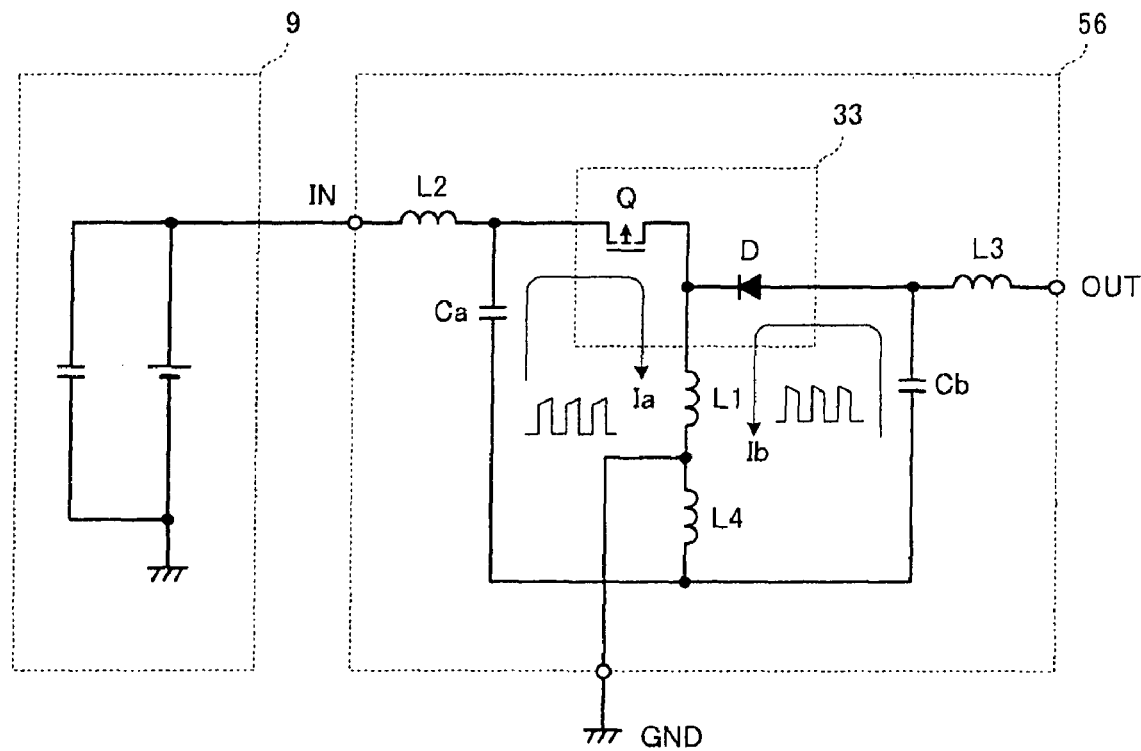

FIG. 18 is a circuit diagram of the inverting DC-DC converter according to the sixth embodiment.

Figure 19:
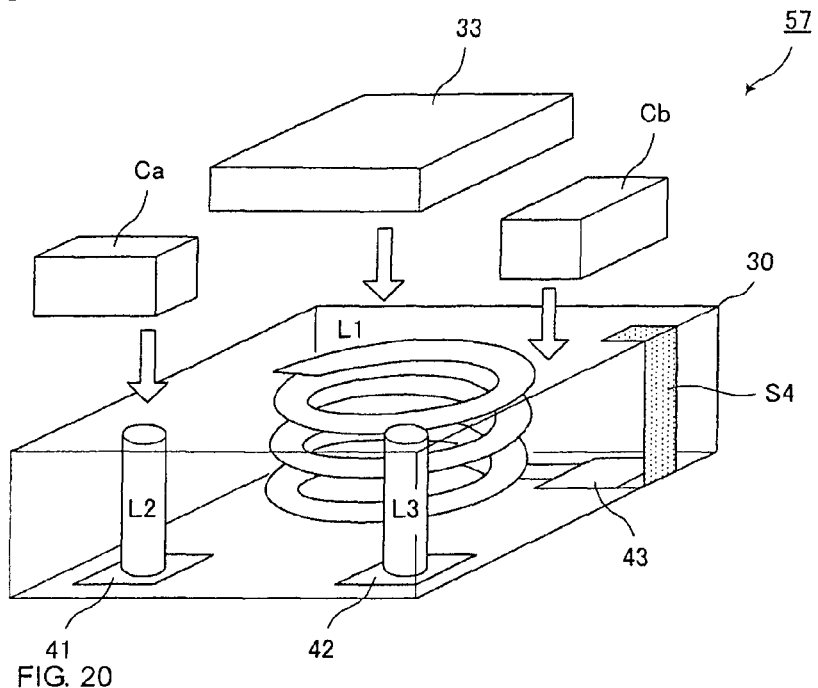

FIG. 19 is an exploded perspective view of an inverting DC-DC converter according to a seventh embodiment.

Figure 20:
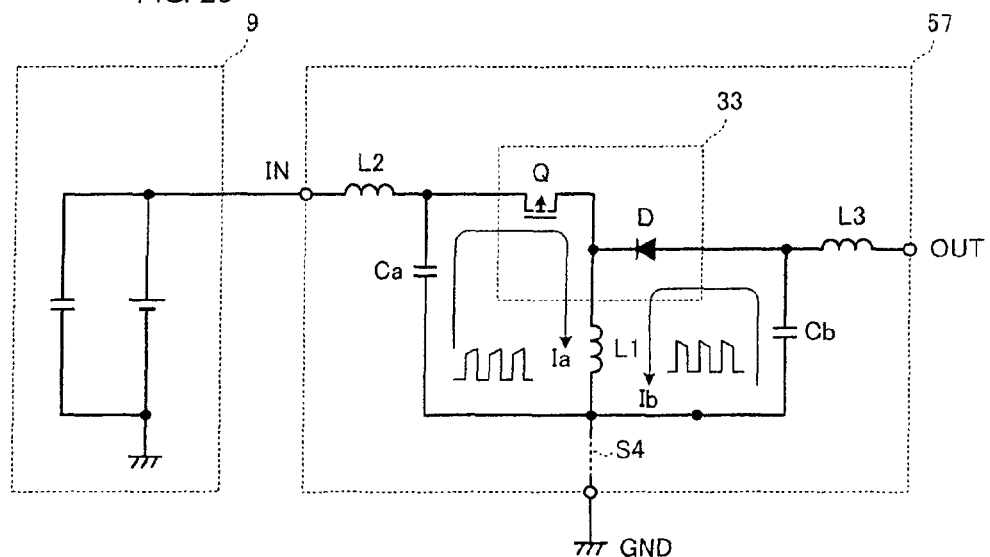

FIG. 20 is a circuit diagram of the inverting DC-DC converter according to the seventh embodiment.

Figure 21:
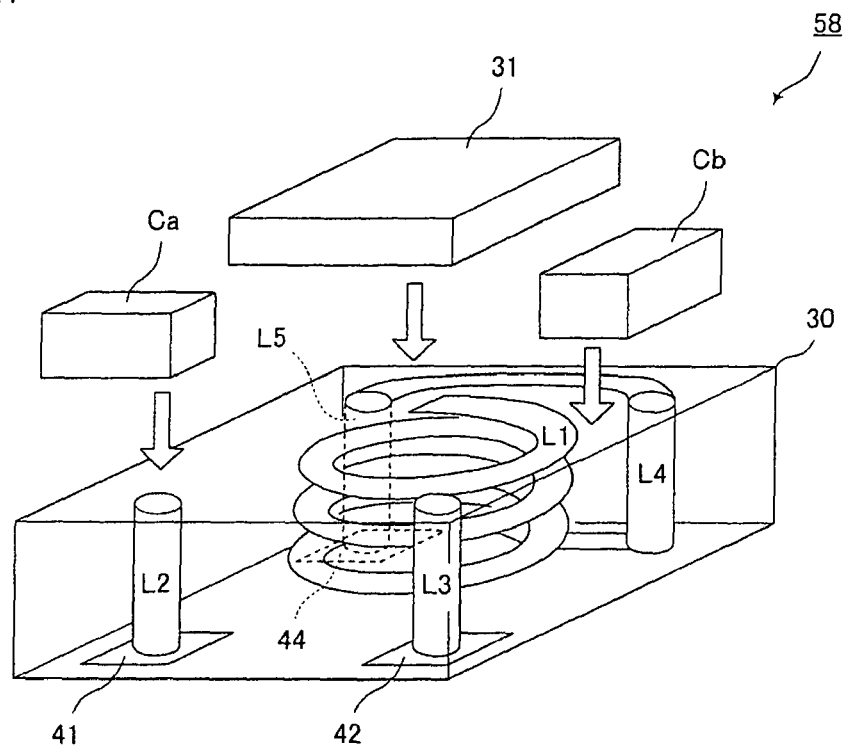

FIG. 21 is an exploded perspective view of a step-down DC-DC converter according to an eighth embodiment.

Figure 22:
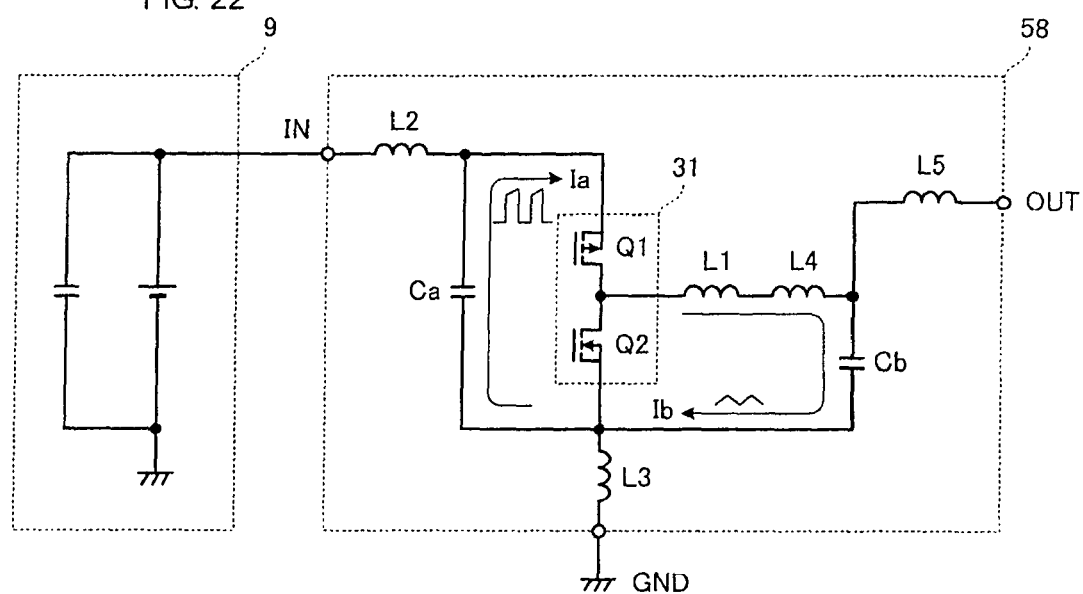

FIG. 22 is a circuit diagram of the step-down DC-DC converter according to the eighth embodiment.

Figure 23:
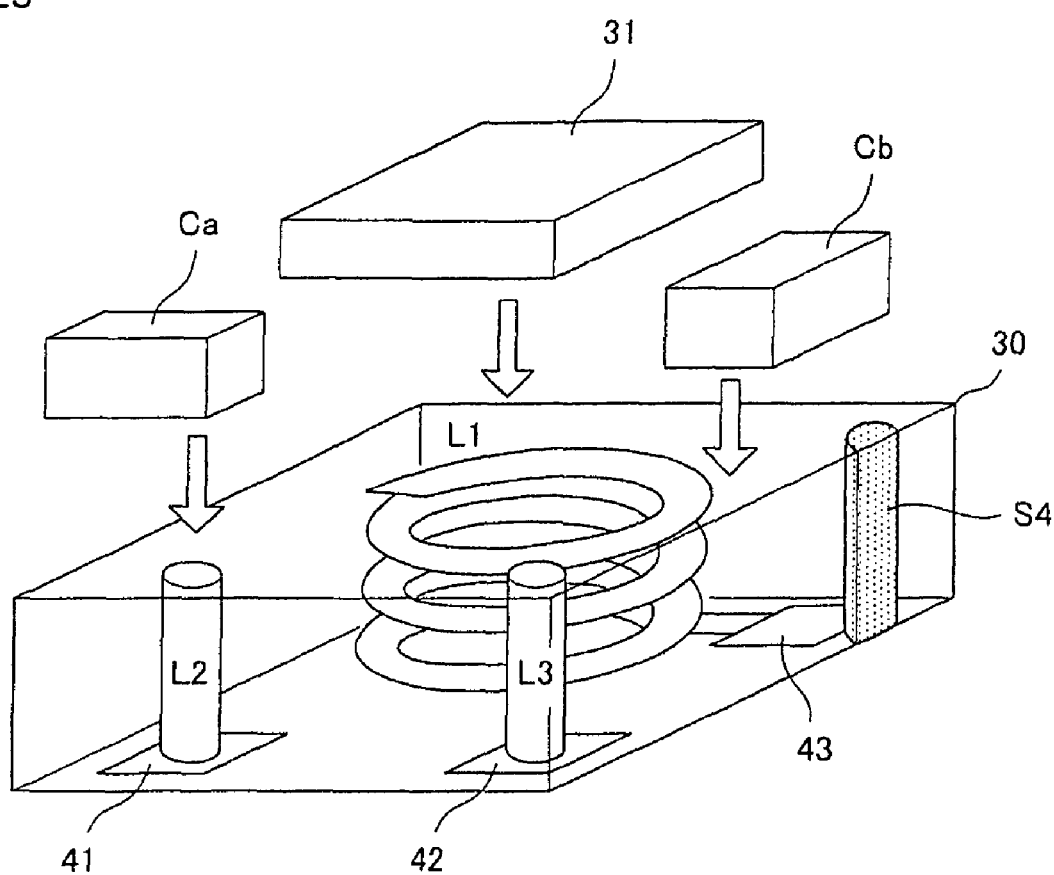

FIG. 23 is an exploded perspective view of a step-down DC-DC converter according to a ninth embodiment.

DETAILED DESCRIPTION OF PREFERRED EMBODIMENTS

A step-down DC-DC converter module according to a first embodiment is described with reference to FIGS. 5 to 7.

Figure 5:
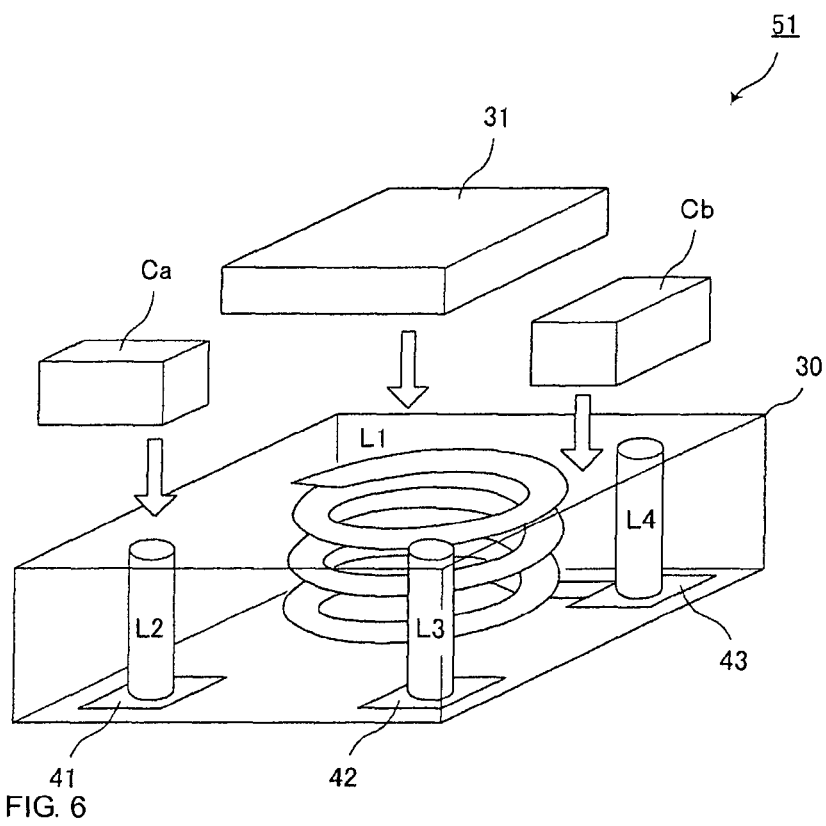
FIG. 5 is an exploded perspective view of a step-down DC-DC converter according to a first embodiment.
Figure 6:
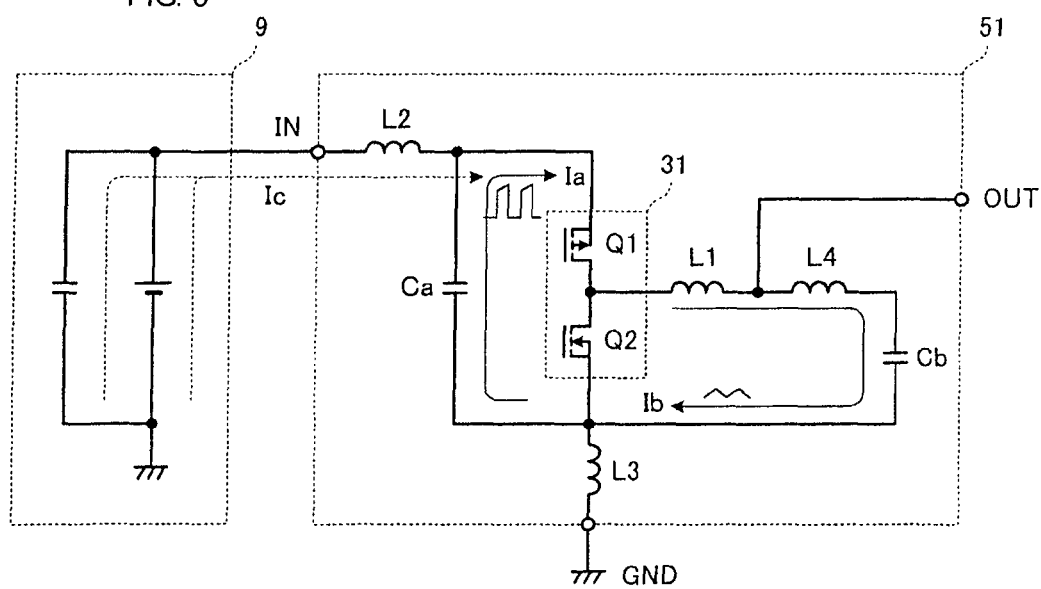
FIG. 6 is a circuit diagram of the step-down DC-DC converter according to the first embodiment.

FIG. 5 is an exploded perspective view of the step-down DC-DC converter module, and FIG. 6 is a circuit diagram thereof. It is to be noted that the perspective view is transparently illustrated to show the internal configuration of a magnetic substrate and the configuration of the lower surface. This illustrating manner also applies to other subsequent embodiments described below.

In FIG. 5, lower surface terminals 41 to 43 are disposed at the lower surface of a magnetic substrate 30. An upper surface electrode, whose pattern is not shown, is disposed at the upper surface of the magnetic substrate 30. A smoothing choke L1 and inductors L2, L3, and L4 connected between the respective lower surface terminals and the upper surface electrode are disposed inside the magnetic substrate 30. The smoothing choke L1 is constructed from a spiral conductor. Each of the inductors L2 to L4 is constructed using a via.

A control circuit 31, an input capacitor Ca, and an output capacitor Cb are mounted on the upper surface of the magnetic substrate 30. The control circuit 31 contains a switching element. These components are electrically connected to the upper surface electrode of the magnetic substrate 30.

When the above step-down DC-DC converter 51 is in the state of being implemented to a wiring board of an electronic device, an input terminal IN of the step-down DC-DC converter 51 is connected to an input voltage source 9, as illustrated in FIG. 6. In FIGS. 5 and 6, the input terminal IN corresponds to the lower surface terminal 41; an output terminal OUT corresponds to the lower surface terminal 43; and a ground terminal GND correspond to the lower surface terminal 42. The same reference numerals are used for the other corresponding components in FIGS. 5 and 6.

The control circuit 31 includes a main switching element Q1, a synchronous rectifying element Q2 serving as a flywheel element, and, in addition to these elements, a switching control circuit that performs switching control of these elements. The switching control circuit in the control circuit 31 produces a dead time when neither the main switching element Q1 nor the synchronous rectifying element Q2 is turned on and alternately turns on and off the main switching element Q1 and the synchronous rectifying element Q2.

Figure 1:
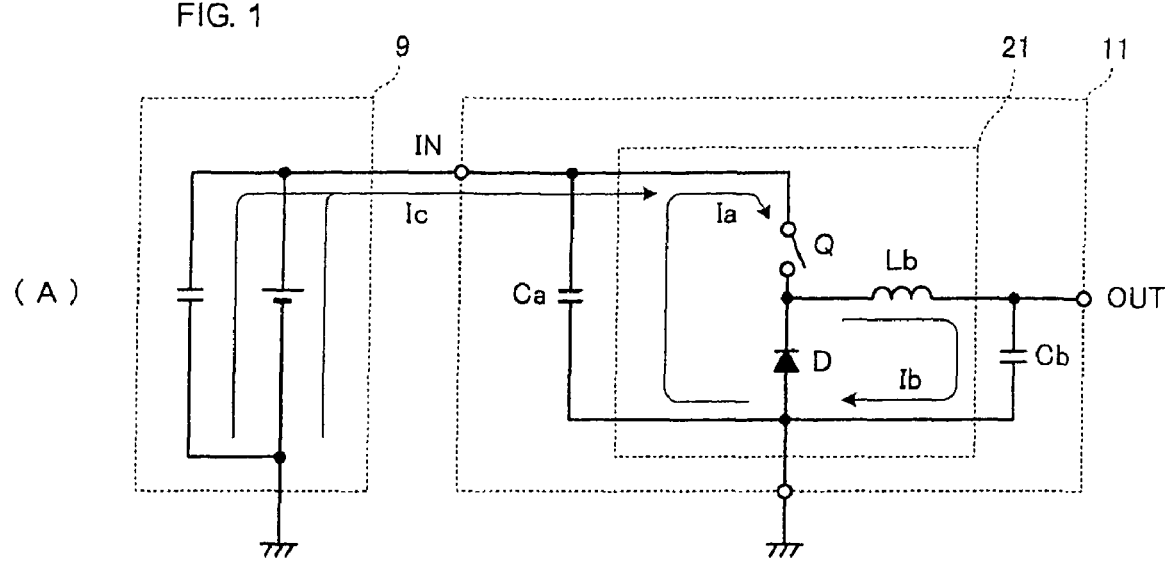
FIG. 1(A) illustrates a circuit diagram of a traditional step-down DC-DC converter.
FIG. 1(B) illustrates current waveforms of portions thereof.
Figure 1:
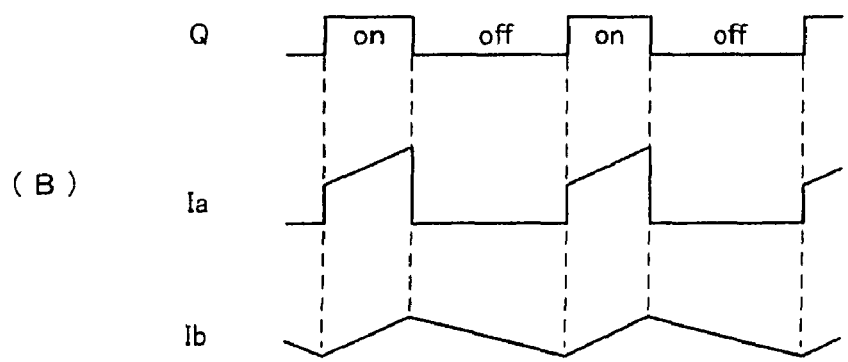

The step-down DC-DC converter 51 illustrated in FIG. 6 significantly differs from the step-down DC-DC converter illustrated in FIG. 1(A) in that the inductors L2 and L3 are placed in series with respect to the current line (i.e., input line) flowing from the input voltage source 9 to the input terminal IN. Each of the inductors L2 and L3 is constructed using a via formed inside the magnetic substrate 30, as illustrated in FIG. 5, and the inductance thereof effectively can suppress a pulse current that flows from the input voltage source 9 when the main switching element Q1 is in an ON state. Thus, the pulse current containing a high radio-frequency content flows in the input capacitor Ca nearly completely and hardly leaks out. Accordingly, the noise problem with the use of the DC-DC converter can be reduced.

It is also important that, as illustrated in FIG. 5, the winding direction of the smoothing choke L1 is different from the winding direction (i.e., wiring direction) of each of the other inductors L2 to L4 by 90 degrees, that is, their magnetic fields are perpendicular to each other. This structure leads to a small magnetic coupling between the smoothing choke L1 and each of the other inductors L2 to L4, and, thus, unnecessary electromotive voltage does not occur in the inductors L2 to L4, and ripples occurring in the input voltage and the output voltage are small. Additionally, because each of the inductors L2 to L4 is an inductor having a single short turn, the magnetic flux produced by the wiring is not large and its effects on adjacent wiring are small.

It is also important that, because the magnetic flux produced by the smoothing choke L1 in the DC-DC converter is the largest, the winding direction of the smoothing choke L1 and the wiring direction of the upper surface electrode are different by 90 degrees, and their magnetic fields are perpendicular to each other. This leads to small flux linkage and also small magnetic coupling with the upper surface electrode.

Figure 7:
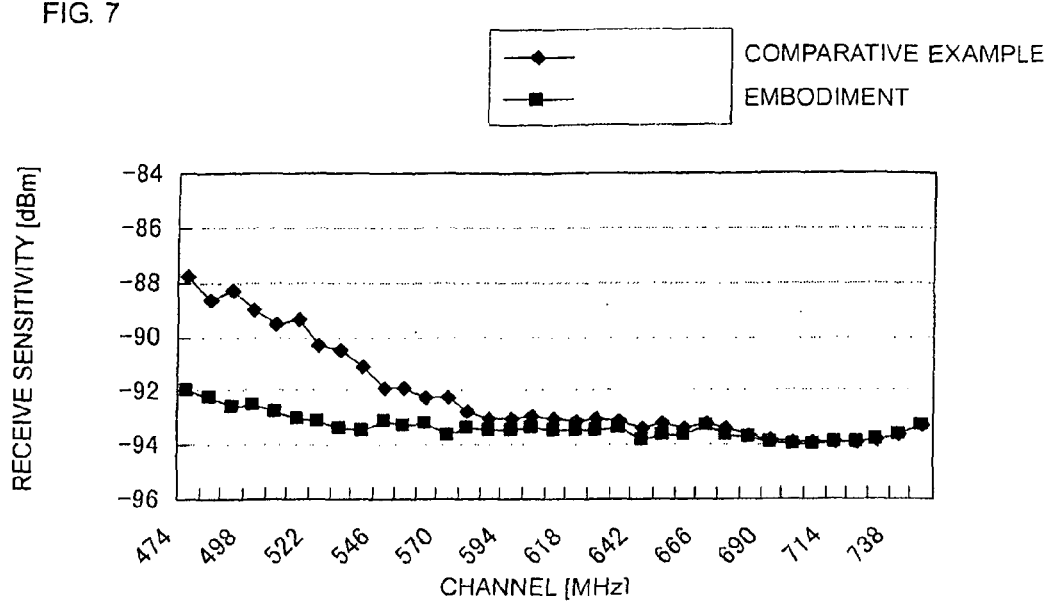
FIG. 7 illustrates characteristics of the step-down DC-DC converter.

A comparison between receive sensitivity when the step-down DC-DC converter according to the first embodiment is used as a reception module and that of a comparative example is illustrated in FIG. 7. A discrete circuit in which a semiconductor component, input and output capacitors, and an inductor serving as a component are arranged on a printed board is selected as the comparative example. As is clear from FIG. 7, the use of the DC-DC converter according to the present invention can achieve an improvement of 4 dBm in the receive sensitivity in a low-frequency range. In such a way, the noise problem resulting from the DC-DC converter module can be significantly reduced.

In the example illustrated in FIG. 6, a field-effect transistor (FET) is used as the synchronous rectifying element Q2 acting as the flywheel element. Alternatively, a diode may be used as the flywheel element. In the example illustrated in FIG. 6, a combination of a p-channel FET and an n-channel FET is used as the switching element. Alternatively, a combination of an n-channel FET and an n-channel FET may be used. Still another element, a bipolar transistor may also be used as the switching element. The same applies to second and subsequent embodiments described below.

In the example illustrated in FIG. 5, the smoothing choke L1 is constructed from a spiral conductor. Alternatively, the smoothing choke L1 may have other shapes, such as toroidal winding and zigzag wiring. The same applies to the second and subsequent embodiments described below.

Figure 4:
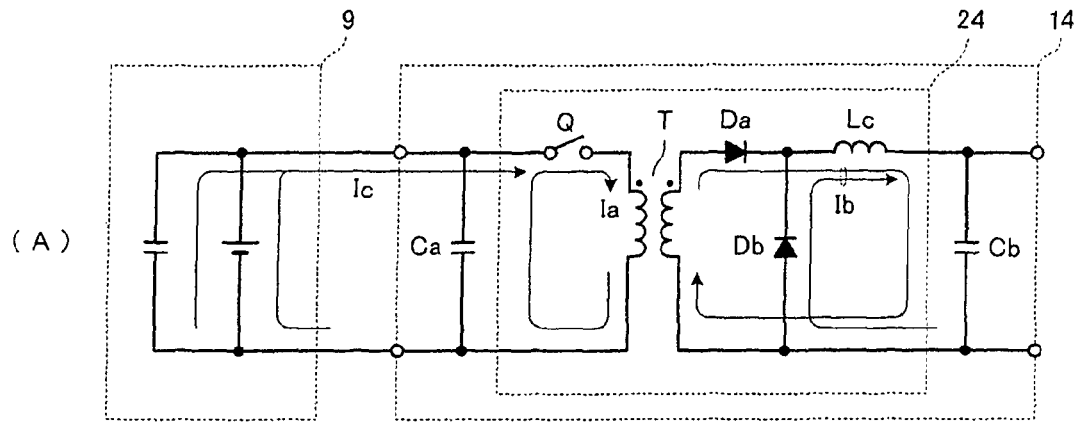
FIG. 4(A) illustrates a circuit diagram of a traditional forward DC-DC converter.
FIG. 4(B) illustrates that of a traditional flyback DC-DC converter.
Figure 4:
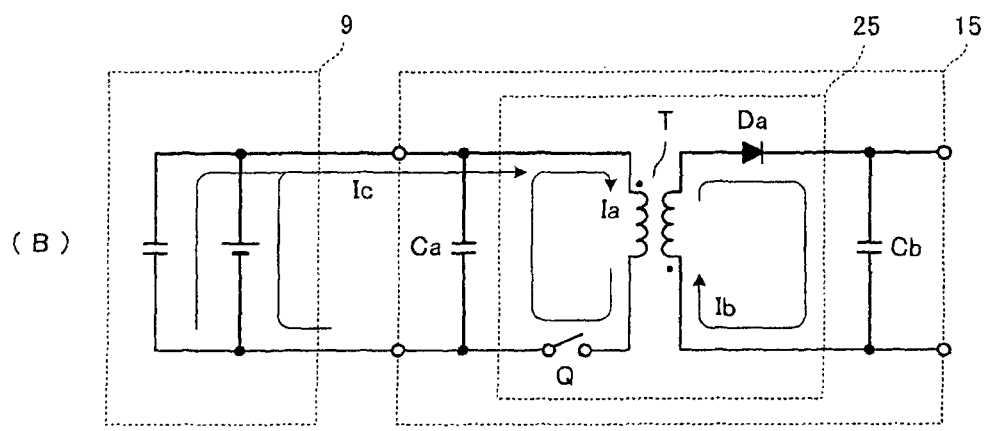

Furthermore, in the example illustrated in FIG. 6, the non-isolated step-down DC-DC converter using the magnetic substrate is configured. Similarly, the isolated forward DC-DC converter illustrated in FIG. 4(A) may also be configured. That is, if, in place of the smoothing choke L1, a transformer T is constructed in the magnetic substrate 30, the inductors L2 and L3 are placed in series with respect to the current line (i.e., input line) flowing from the input voltage source 9 to the input terminal IN. Accordingly, the pulse current flowing from the input voltage source 9, when the main switching element Q1 is in an ON state, can be effectively suppressed, and the pulse current containing a high radio-frequency content flows in the input capacitor Ca nearly completely and hardly leaks out.

As described above, for a DC-DC converter of the "discontinuous input current-continuous output current" type, such as a step-down DC-DC converter or a forward DC-DC converter, passing the wiring of the input terminal through the inside of the magnetic substrate is effective in noise reduction.

A step-down DC-DC converter module according to a second embodiment is described with reference to FIGS. 8 to 10.

Figure 8:
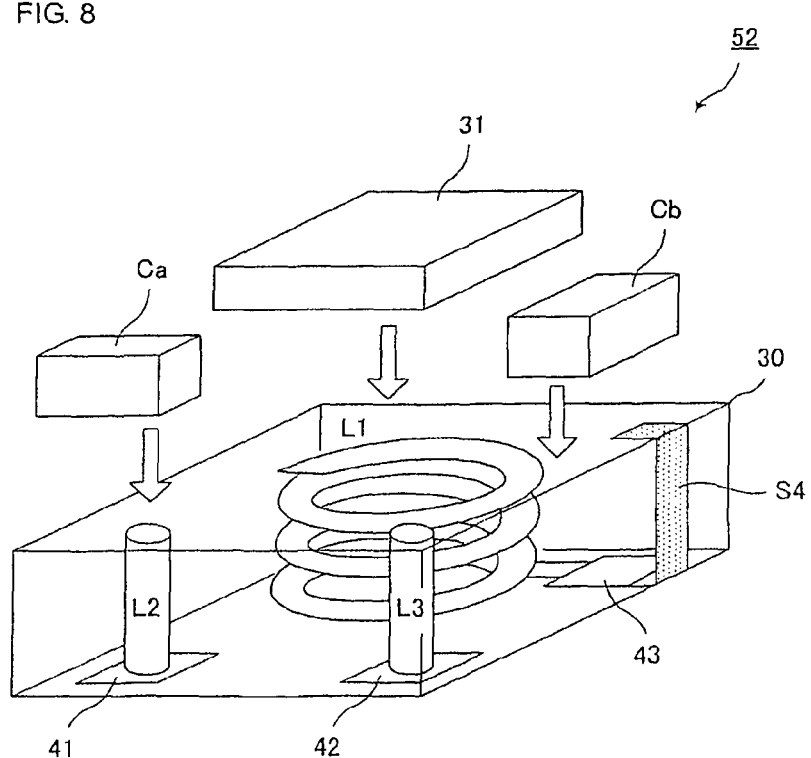
FIG. 8 is an exploded perspective view of a step-down DC-DC converter according to a second embodiment.
Figure 9:
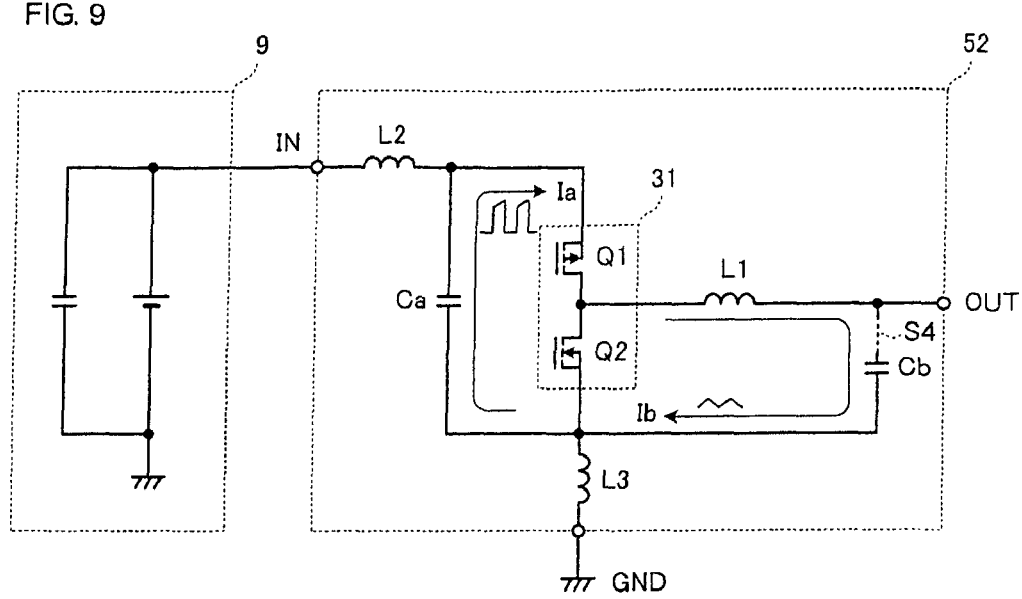
FIG. 9 is a circuit diagram of the step-down DC-DC converter according to the second embodiment.

FIG. 8 is an exploded perspective view of the step-down DC-DC converter module, and FIG. 9 is a circuit diagram thereof.

In FIG. 8, lower surface terminals 41 to 43 are disposed at the lower surface of a magnetic substrate 30. An upper surface electrode, whose pattern is not shown, is disposed at the upper surface of the magnetic substrate 30. A smoothing choke L1 and inductors L2 and L3 connected between the corresponding lower surface terminals and the upper surface electrode are disposed inside the magnetic substrate 30. An end face conductor S4 connected between the corresponding lower surface terminal and the upper surface electrode is disposed at an end face of the magnetic substrate 30. The smoothing choke L1 is configured such that a conductor has a spiral shape. Each of the inductors L2 and L3 is constructed using a via.

The use of the end face conductor S4 allows the omission of the inductor L4 illustrated in FIG. 6 and results in the circuit configuration illustrated in FIG. 9.

As shown in FIG. 8, a control circuit 31, an input capacitor Ca, and an output capacitor Cb are mounted on the upper surface of the magnetic substrate 30. The control circuit 31 contains a switching element. These components are electrically connected to the upper surface electrode of the magnetic substrate 30.

When the above step-down DC-DC converter 52 is in the state of being implemented to a wiring board of an electronic device, an input terminal IN of the step-down DC-DC converter 52 is connected to an input voltage source 9, as illustrated in FIG. 9. In FIGS. 8 and 9, the input terminal IN corresponds to the lower surface terminal 41; an output terminal OUT corresponds to the lower surface terminal 43; and a ground terminal GND correspond to the lower surface terminal 42. The same reference numerals are used for the other corresponding components in FIGS. 8 and 9.

The DC-DC converter module according to the present embodiment differs from that according to the first embodiment illustrated in FIGS. 5 and 6 in that the output capacitor Cb and the smoothing choke L1 are connected using the end face conductor S4, not using a via formed inside the magnetic substrate 30. This configuration can reduce the impedance of the output capacitor Cb with respect to the output ripple, and a rectangular wave content appearing in a ripple of the output voltage can be effectively suppressed correspondingly.

Figure 10:
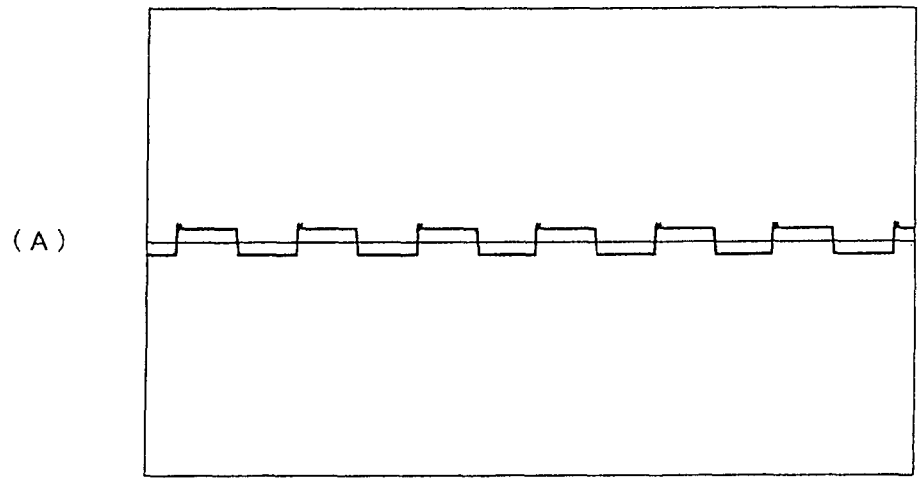
Figure 10:
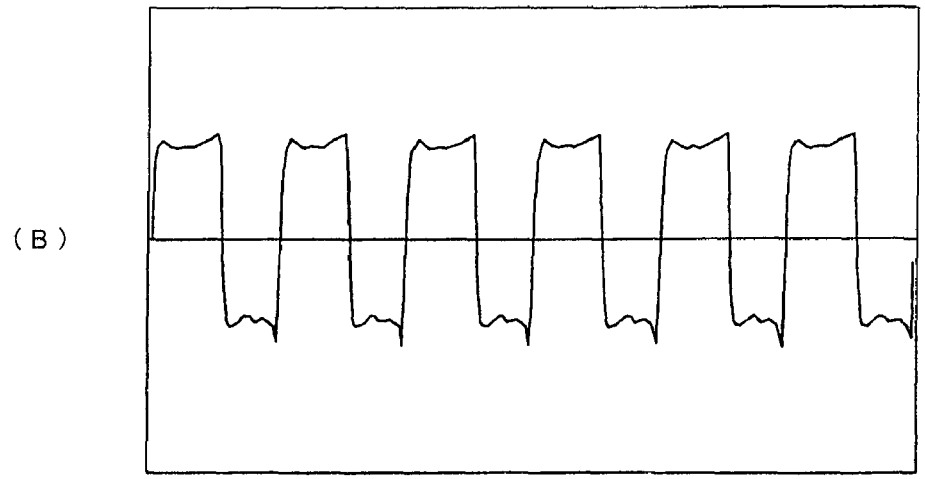

FIG. 10 illustrates advantages provided by connection between the output capacitor Cb and the smoothing choke L1 using the end face conductor S4. FIG. 10(A) illustrates a ripple waveform of voltage of the output terminal OUT illustrated in FIG. 9. FIG. 10(B) illustrates a ripple waveform of voltage of the output terminal OUT of the DC-DC converter having the configuration illustrated in FIG. 5 in which the output capacitor Cb and the smoothing choke L1 are connected using a via formed inside the magnetic substrate. The illustrations FIG. 10(A) and FIG. 10(B) use the same scale in the voltage axis (i.e., vertical axis) and the same scale in the time axis (i.e., horizontal axis).

As described above, in the second embodiment, there is substantially no inductance content of the inductor L4 illustrated in FIG. 6. Thus, a rectangular wave content appearing in a ripple of the output voltage is small, and more ideal characteristics of the DC-DC converter are obtainable.

As described above, for a DC-DC converter of the "discontinuous input current-continuous output current" type, such as a step-down DC-DC converter or a forward DC-DC converter, it is preferable that the wiring of the input terminal pass through the inside of the magnetic substrate, and the wiring of the output terminal pass outside the magnetic substrate.

A step-down DC-DC converter module according to a third embodiment is described with reference to FIGS. 11 and 12.

FIG. 11 is an exploded perspective view of the step-down DC-DC converter module, and FIG. 12 is a circuit diagram thereof.

In FIG. 11, lower surface terminals 41 to 43 are disposed at the lower surface of a magnetic substrate 30. An upper surface electrode, whose pattern is not shown, is disposed at the upper surface of the magnetic substrate 30. A smoothing choke L1 and inductors L2 and L3 connected between the corresponding lower surface terminals and the upper surface electrode are disposed inside the magnetic substrate 30. An end face conductor S4 connected between the corresponding lower surface terminal and the upper surface electrode is disposed at an end face of the magnetic substrate 30. The smoothing choke L1 is constructed from a spiral conductor. The inductor L2 is also constructed from a spiral conductor. The inductor L3 is constructed using a via.

As shown in FIG. 11, a control circuit 31, an input capacitor Ca, and an output capacitor Cb are mounted on the upper surface of the magnetic substrate 30. The control circuit 31 contains a switching element. These components are electrically connected to the upper surface electrode of the magnetic substrate 30.

When the above step-down DC-DC converter 53 is in the state of being implemented to a wiring board of an electronic device, an input terminal IN of the step-down DC-DC converter 53 is connected to an input voltage source 9, as illustrated in FIG. 12. In FIGS. 11 and 12, the input terminal IN corresponds to the lower surface terminal 41, an output terminal OUT corresponds to the lower surface terminal 43, and a ground terminal GND correspond to the lower surface terminal 42. The same reference numerals are used for the other corresponding components in FIGS. 11 and 12.

The DC-DC converter module according to the present embodiment differs from that according to the second embodiment illustrated in FIG. 8 in that the inductor L2 is constructed from a spiral conductor. This structure can increase the inductance of the input wiring, and the advantages of suppressing noise leakage can be enhanced.

The winding direction of the smoothing choke L1 and the winding direction of the inductor L2 are different by 90 degrees. That is, their magnetic fields are perpendicular to each other. Accordingly, the magnetic coupling between the smoothing choke L1 and the inductor L2 is small, and, thus, no unnecessary electromotive voltage occurs in the inductor L2, and ripples occurring in the input voltage are small.

In this example, each of the smoothing choke L1 and the inductor L2 is constructed from a spiral conductor. However, they may also have other shapes, such as toroidal wiring and zigzag wiring.

A step-up DC-DC converter module according to a fourth embodiment is described with reference to FIGS. 13 and 14.

FIG. 13 is an exploded perspective view of the step-up DC-DC converter module, and FIG. 14 is a circuit diagram thereof.

In FIG. 13, lower surface terminals 41 to 43 are disposed at the lower surface of a magnetic substrate 30. An upper surface electrode, whose pattern is not shown, is disposed at the upper surface of the magnetic substrate 30. A smoothing choke L1 and inductors L2, L3, and L4 connected between the respective lower surface terminals and the upper surface electrode are disposed inside the magnetic substrate 30. The smoothing choke L1 is constructed from a spiral conductor. Each of the inductors L2 to L4 is constructed using a via.

Further, as shown in FIG. 13, a control circuit 32, an input capacitor Ca, and an output capacitor Cb are mounted on the upper surface of the magnetic substrate 30. The control circuit 32 contains a switching element. These components are electrically connected to the upper surface electrode of the magnetic substrate 30.

When the above step-up DC-DC converter 54 is in the state of being implemented to a wiring board of an electronic device, an input terminal IN of the step-up DC-DC converter 54 is connected to an input voltage source 9, as illustrated in FIG. 14. In FIGS. 13 and 14, the input terminal IN corresponds to the lower surface terminal 43; an output terminal OUT corresponds to the lower surface terminal 42; and a ground terminal GND correspond to the lower surface terminal 41. The same reference numerals are used for the other corresponding components in FIGS. 13 and 14.

The control circuit 32 includes a switching element Q, a diode D, and, in addition to these elements, a switching control circuit that performs switching control of these elements.

Figure 2:
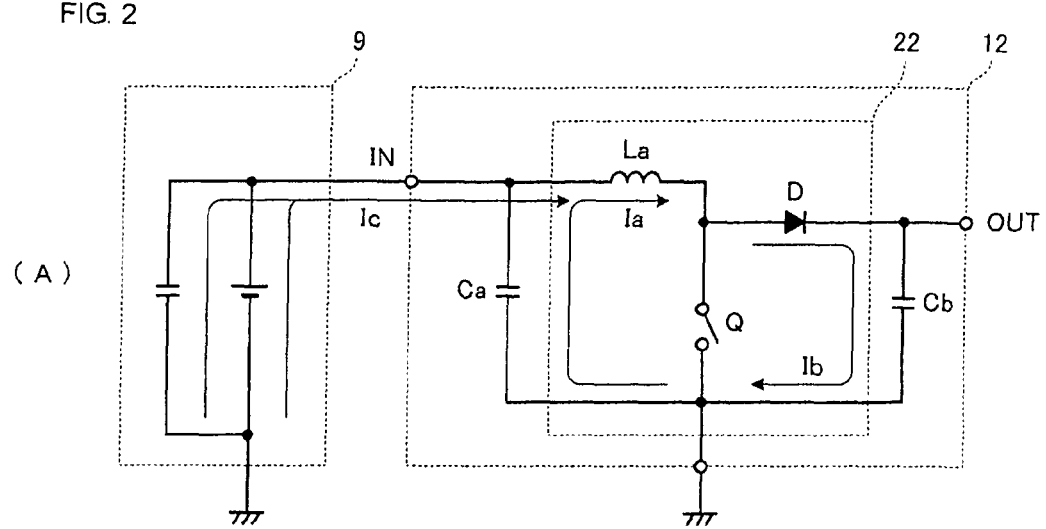
FIG. 2(A) illustrates a circuit diagram of a traditional step-up DC-DC converter.
FIG. 2(B) illustrates current waveforms of portions thereof.
Figure 2:
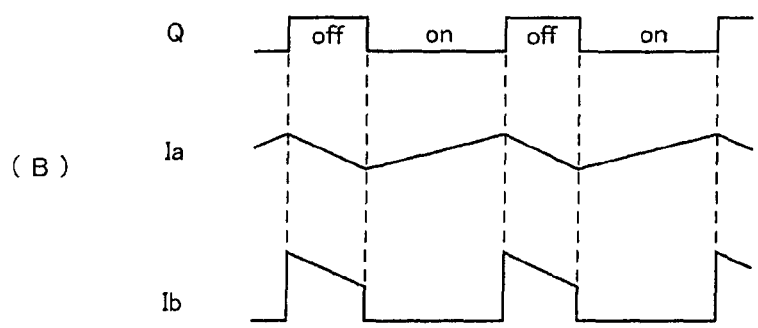

The step-up DC-DC converter 54 illustrated in FIG. 14 significantly differs from the step-up DC-DC converter illustrated in FIG. 2(A) in that the inductors L2 and L3 are placed in series in the path of current flowing from the output capacitor Cb to the load through the output terminal OUT.

For a step-up DC-DC converter, the current flowing into the diode (i.e., output current) exhibits a discontinuous rectangular waveform. However, because each of the inductors L2 and L3 is constructed using a via formed inside the magnetic substrate 30, as illustrated in FIG. 14, a radio-frequency content of the rectangular wave current can be suppressed by the inductance thereof. Thus, the radio-frequency content flows in the output capacitor Cb nearly completely and hardly leaks out. Accordingly, ripples of the output voltage supplied from the output terminal to the load can be suppressed, and the noise problem at the output side can be overcome.

As described above, for a DC-DC converter of the "continuous input current-discontinuous output current" type, such as a step-up DC-DC converter, passing the wiring of the output terminal through the inside of the magnetic substrate is effective in noise reduction.

A step-up DC-DC converter module according to a fifth embodiment is described with reference to FIGS. 15 and 16.

FIG. 15 is an exploded perspective view of the step-up DC-DC converter module 55, and FIG. 16 is a circuit diagram thereof.

The DC-DC converter module according to the present invention differs from the fourth embodiment illustrated in FIGS. 13 and 14 in that the input capacitor Ca and the input terminal IN are connected using an end face conductor S4, not using a via formed inside the magnetic substrate 30. This configuration can reduce the impedance of the input capacitor Ca with respect to the pulse current, and the pulse current containing a high radio-frequency content flows in the input capacitor Ca nearly completely and hardly leaks out. Accordingly, the noise problem with the use of the DC-DC converter can be reduced.

As described above, for a DC-DC converter of the "continuous input current-discontinuous output current" type, such as a step-up DC-DC converter or a flyback DC-DC converter, it is preferable that the wiring of the output terminal pass through the inside of the magnetic substrate, and the wiring of the input terminal pass outside the magnetic substrate.

An inverting DC-DC converter module according to a sixth embodiment is described with reference to FIGS. 17 and 18.

FIG. 17 is an exploded perspective view of the inverting DC-DC converter module, and FIG. 18 is a circuit diagram thereof.

In FIG. 17, lower surface terminals 41 to 43 are disposed at the lower surface of a magnetic substrate 30. An upper surface electrode, whose pattern is not shown, is disposed at the upper surface of the magnetic substrate 30. A smoothing choke L1 and inductors L2, L3, and L4 connected between the respective lower surface terminals and the upper surface electrode are disposed inside the magnetic substrate 30. The smoothing choke L1 is constructed from a spiral conductor. Each of the inductors L2 to L4 is constructed using a via.

A control circuit 33, an input capacitor Ca, and an output capacitor Cb are mounted on the upper surface of the magnetic substrate 30. The control circuit 33 contains a switching element. These components are electrically connected to the upper surface electrode of the magnetic substrate 30.

When the above inverting DC-DC converter 56 is in the state of being implemented to a wiring board of an electronic device, an input terminal IN of the inverting DC-DC converter 56 is connected to an input voltage source 9, as illustrated in FIG. 18. In FIGS. 17 and 18, the input terminal IN corresponds to the lower surface terminal 41; an output terminal OUT corresponds to the lower surface terminal 42; and a ground terminal GND correspond to the lower surface terminal 43. The same reference numerals are used for the other corresponding components in FIGS. 17 and 18.

The control circuit 33 includes a switching element Q, a diode D, and, in addition to these elements, a switching control circuit that performs switching control of these elements.

Figure 3:
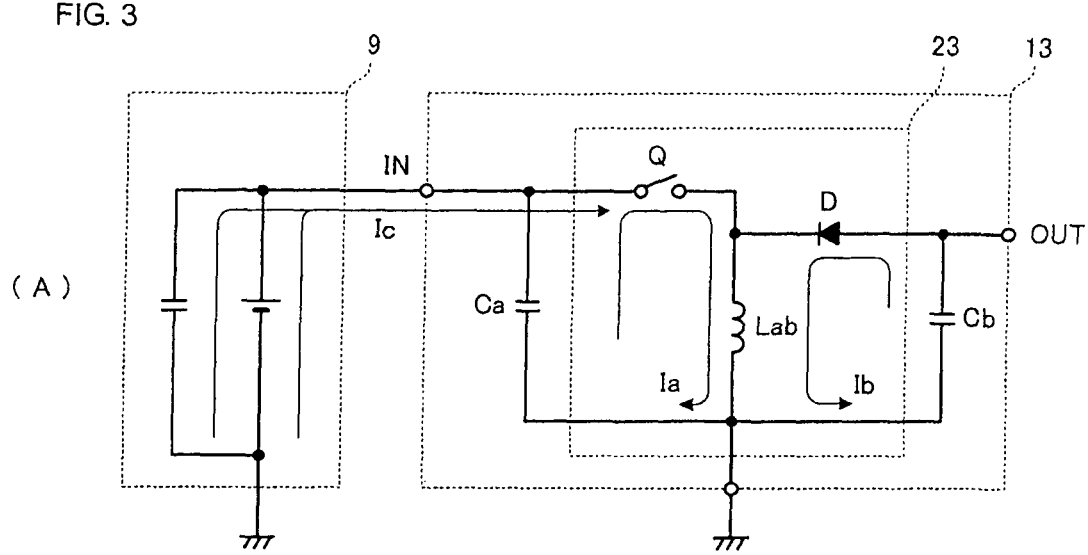
FIG. 3(A) illustrates a circuit diagram of a traditional inverting DC-DC converter.
FIG. 3(B) illustrates current waveforms of portions thereof.
Figure 3:
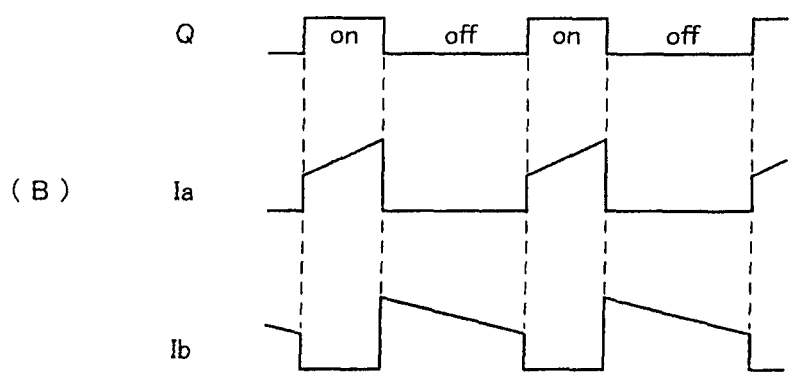

One difference between the inverting DC-DC converter 56 illustrated in FIG. 18 and the inverting DC-DC converter illustrated in FIG. 3(A) is that the inductors L2 and L4 are placed in series with respect to the current line (i.e., input line) flowing from the input voltage source 9 to the input terminal IN in the present embodiment. Each of the inductors L2 and L4 is constructed using a via formed inside the magnetic substrate 30, as illustrated in FIG. 17, and the inductance thereof can effectively suppress the pulse current flowing from the input voltage source 9 when the switching element Q is in an ON state. Thus, the pulse current containing a high radio-frequency content flows in the input capacitor Ca nearly completely and hardly leaks out. Accordingly, the noise problem with the use of the DC-DC converter module can be reduced.

Another difference between the inverting DC-DC converter 56 illustrated in FIG. 18 and the inverting DC-DC converter illustrated in FIG. 3(A) is that the inductor L3 is inserted is series in the path of the current flowing from the output capacitor Cb to the load through the output terminal OUT.

For an inverting DC-DC converter, the current flowing into the diode D (i.e., output current) exhibits a discontinuous rectangular waveform. However, because the inductor L3 is constructed using a via formed inside the magnetic substrate 30, as illustrated in FIG. 17, the inductance thereof can suppress a radio-frequency content of the rectangular wave current. Thus, the radio-frequency content flows in the output capacitor Cb nearly completely and hardly leaks out. Accordingly, ripples of the output voltage supplied from the output terminal to the load can be suppressed, and the noise problem at the output side can be overcome.

In the example illustrated in FIG. 18, the non-isolated inverting DC-DC converter using the magnetic substrate is configured. Similarly, the isolated flyback DC-DC converter illustrated in FIG. 4(B) may be configured. Because both the non-isolated inverting DC-DC converter and the isolated flyback DC-DC converter are of the "discontinuous input current-discontinuous output current" type, it is clear that if the transformer T is used in place of the smoothing choke L1 in the magnetic substrate 30, similar advantages are obtainable.

As described above, for a DC-DC converter of the "discontinuous input current-discontinuous output current" type, such as an inverting DC-DC converter or a flyback DC-DC converter, it is preferable that the wiring of the input and output terminals pass through the inside of the magnetic substrate.

An inverting DC-DC converter module according to a seventh embodiment is described with reference to FIGS. 19 and 20.

FIG. 19 is an exploded perspective view of the inverting DC-DC converter module 57, and FIG. 20 is a circuit diagram thereof.

The DC-DC converter according to the present embodiment differs from that according to the sixth embodiment illustrated in FIGS. 17 and 18 in that the smoothing choke L1 and the input capacitor Ca are connected using an end face conductor S4, not using a via formed inside the magnetic substrate 30 in the present embodiment. This configuration can reduce the inductance of wiring occurring in the wiring between the ground terminal, which is one of the lower surface terminals disposed at the lower surface of the magnetic substrate 30, and the input capacitor Ca and the output capacitor Cb, which are mounted on the upper surface of the magnetic substrate 30. Thus, a phenomenon in which a rectangular wave shaped noise caused by a pulsating ripple current flowing through the smoothing choke L1 occurs in the ground terminal disposed at the lower surface of the magnetic substrate can be suppressed. Accordingly, a noise output to the outside can be additionally reduced.

As described above, for a DC-DC converter of the "discontinuous input current-discontinuous output current" type, such as an inverting DC-DC converter or a flyback DC-DC converter, it is preferable that the wiring of the ground terminal pass outside the inside of the magnetic substrate 30, and the wiring of the input and output terminals pass through the inside of the magnetic substrate.

A step-down DC-DC converter module according to an eighth embodiment is described with reference to FIGS. 21 and 22.

FIG. 21 is an exploded perspective view of the step-down DC-DC converter module, and FIG. 22 is a circuit diagram thereof.

In FIG. 21, lower surface terminals 41, 42, and 44 are disposed at the lower surface of a magnetic substrate 30. An upper surface electrode, whose pattern is not shown, is disposed at the upper surface of the magnetic substrate 30. A smoothing choke L1 and inductors L2, L3, L4, and L5 connected between the respective lower surface terminals and the upper surface electrode are disposed inside the magnetic substrate 30. The smoothing choke L1 is constructed from a spiral conductor. Each of the inductors L2 to L5 is constructed using a via.

A control circuit 31, an input capacitor Ca, and an output capacitor Cb are mounted on the upper surface of the magnetic substrate 30. The control circuit 31 contains a switching element. These components are electrically connected to the upper surface electrode of the magnetic substrate 30.

When the above step-down DC-DC converter 58 is in the state of being implemented on a wiring board of an electronic device, an input terminal IN of the step-down DC-DC converter 58 is connected to an input voltage source 9, as illustrated in FIG. 22. In FIGS. 21 and 22, the input terminal IN corresponds to the lower surface terminal 41, an output terminal OUT corresponds to the lower surface terminal 44, and a ground terminal GND correspond to the lower surface terminal 42. The same reference numerals are used for the other corresponding components in FIGS. 21 and 22.

The DC-DC converter according to the present embodiment differs from the first embodiment illustrated in FIGS. 5 and 6 in that opposite ends of the smoothing choke L1 (i.e., both the start of the winding and the end of the winding) are drawn on the upper surface (i.e., component carrying surface) of the magnetic substrate 30, and in that the wiring from the upper surface to the lower surface terminals passes through the inside of the magnetic substrate 30. This configuration can increase the inductance of the smoothing choke L1 by the amount corresponding to the inductor L4 and reduce the output ripple determined by the inductance value of the smoothing choke L1 and the capacitance value of the output capacitor Cb. Additionally, because the inductor L5 is placed in series with respect to the output terminal, a rectangular wave content appearing in a ripple of the output voltage can be effectively suppressed. Accordingly, more ideal characteristics of the DC-DC converter are obtainable.

Configuring the connection wiring of connecting the opposite ends of the smoothing choke and the upper surface electrode using the inner conductor in the magnetic substrate 30 as described above is not limited to a step-down DC-DC converter module and is also applicable to a DC-DC converter module of another type, such as the step-up type or the inverting type. In this case, similar advantages are obtainable. In addition, it is also applicable to another type of converter using a magnetic substrate, such as an isolated DC-DC converter and an AC-DC converter.

FIG. 23 is an exploded perspective view of a step-down DC-DC converter module according to a ninth embodiment. This step-down DC-DC converter module differs from the example illustrated in FIG. 8 according to the second embodiment in that an end face conductor S4 has a different structure. In the example illustrated in FIG. 23, the end face conductor S4 is constructed using a divided via formed by vertical division of a via filled with a conductive material along the center thereof.

Such a configuration of the end face conductor can increase the cross-sectional area of the end face conductor and can efficiently reduce the direct current resistance and inductance of the end face conductor. For a DC-DC converter, a direct current resistance content of the wiring is a factor of loss. Thus, minimizing the wiring resistance leads to an improvement in characteristics. In the configuration illustrated in FIG. 8, because the step of forming a via inside the magnetic substrate 30 and the step of applying paste for the external electrode to form an end face conductor are needed, the number of the manufacturing steps is large. In contrast, in the configuration illustrated in FIG. 23, the via can be formed in the state of a mother board (i.e., the state of a board before division, and the board having a plurality of individual products being gathered thereon), and after that, the via can be cut along the center line of the via when the mother board is divided. Accordingly, the cost of manufacturing can be reduced.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:
1. A DC-DC converter module comprising:
a switching portion,
at least one of an input capacitor disposed adjacent to an input side of the switching portion and an output capacitor disposed adjacent to an output side of the switching portion, the switching portion including a switching element and a magnetic element, and a magnetic substrate having a lower surface, at which at least one of an input terminal, an output terminal, and a ground terminal are disposed, and having an upper surface at which an upper surface electrode is disposed, wherein the switching element, and the at least one of the input capacitor and the output capacitor are mounted on the upper surface electrode, and the magnetic element is disposed inside the magnetic substrate, and wherein connection wiring of connecting the upper surface electrode and the at least one of the input terminal, the output terminal, and the ground terminal is constructed using an inner conductor passing through the inside of the magnetic substrate.

2. The DC-DC converter module according to claim 1, wherein the DC-DC converter module is configured to perform switching control such that an input current to the switching portion is discontinuous and an output current from the switching portion is continuous, wherein the input terminal is disposed at the lower surface of the magnetic substrate, and wherein the connection wiring of connecting the input terminal and the upper surface electrode is constructed using the inner conductor.

3. The DC-DC converter module according to claim 2, wherein the output terminal is disposed at the lower surface of the magnetic substrate, and wherein the connection wiring of connecting the output terminal and the upper surface electrode is constructed using an end face conductor extending along an end face of the magnetic substrate.

4. The DC-DC converter module according to claim 1, wherein the DC-DC converter module is configured to perform switching control such that an input current to the switching portion is continuous and an output current from the switching portion is discontinuous, wherein the output terminal is disposed at the lower surface of the magnetic substrate, and wherein the connection wiring of connecting the output terminal and the upper surface electrode is constructed using the inner conductor.

5. The DC-DC converter module according to claim 4, wherein the input terminal is disposed at the lower surface of the magnetic substrate, and wherein the connection wiring of connecting the input terminal, and the upper surface electrode is constructed using an end face conductor extending along an end face of the magnetic substrate.

6. The DC-DC converter module according to claim 1, wherein the DC-DC converter module is configured to perform switching control such that an input current to the switching portion is discontinuous and an output current from the switching portion is discontinuous, wherein the output terminal and the input terminal is disposed at the lower surface of the magnetic substrate, and wherein the connection wiring of connecting the upper surface electrode and each of the output terminal and the input terminal is constructed using the inner conductor.

7. The DC-DC converter module according to claim 6, wherein the ground terminal is disposed at the lower surface of the magnetic substrate, and wherein the connection wiring of connecting the ground terminal, and the upper surface electrode is constructed using an end face conductor extending along an end face of the magnetic substrate.

8. The DC-DC converter module according to claim 2, wherein one end of the magnetic element is directly connected to the upper surface electrode, and wherein connection wiring of connecting the other end of the magnetic element and the upper surface electrode is constructed using the inner conductor.

9. The DC-DC converter module according to claim 3, wherein the end face conductor comprises a divided via.

10. The DC-DC converter module according to claim 1, wherein the inner conductor comprises a via filled with a conductive material.

11. The DC-DC converter module according to claim 1, wherein the magnetic element is spiral (coil), and wherein the winding direction of the magnetic element is different from the winding direction of each of the inner conductors by 90 degrees.

12. The DC-DC converter module according to claim 6, wherein one end of the magnetic element is directly connected to the upper surface electrode, and wherein connection wiring of connecting the other end of the magnetic element and the upper surface electrode is constructed using the inner conductor.

13. The DC-DC converter module according to claim 5, wherein the end face conductor comprises a divided via.

14. The DC-DC converter module according to claim 7, wherein the end face conductor comprises a divided via.

15. The DC-DC converter module according to claim 8, wherein the inner conductor comprises a via filled with a conductive material.

16. The DC-DC converter module according to claim 9, wherein the inner conductor comprises a via filled with a conductive material.

17. The DC-DC converter module according to claim 11, wherein the inner conductor comprises a via filled with a conductive material.

18. The DC-DC converter module according to claim 13, wherein the inner conductor comprises a via filled with a conductive material.

19. The DC-DC converter module according to claim 12, wherein the inner conductor comprises a via filled with a conductive material.

20. The DC-DC converter module according to claim 14, wherein the inner conductor comprises a via filled with a conductive material.

21. The DC-DC converter module according to claim 4, wherein one end of the magnetic element is directly connected to the upper surface electrode, and wherein connection wiring of connecting the other end of the magnetic element and the upper surface electrode is constructed using the inner conductor.

* * * * *